US010697036B2

(12) United States Patent
Takagi et al.

(10) Patent No.: US 10,697,036 B2
(45) Date of Patent: Jun. 30, 2020

(54) STEEL MATERIAL FOR COMPOSITE PRESSURE VESSEL LINER AND STEEL PIPE OR TUBE FOR COMPOSITE PRESSURE VESSEL LINER

(71) Applicant: JFE STEEL CORPORATION, Chiyoda-ku, Tokyo (JP)

(72) Inventors: Shusaku Takagi, Tokyo (JP); Akihide Nagao, Tokyo (JP); Mitsuo Kimura, Tokyo (JP); Hiroshi Okano, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 224 days.

(21) Appl. No.: 15/556,066

(22) PCT Filed: Mar. 7, 2016

(86) PCT No.: PCT/JP2016/001227
§ 371 (c)(1),
(2) Date: Sep. 6, 2017

(87) PCT Pub. No.: WO2016/147594
PCT Pub. Date: Sep. 22, 2016

(65) Prior Publication Data
US 2018/0044748 A1  Feb. 15, 2018
US 2018/0230567 A9  Aug. 16, 2018

(30) Foreign Application Priority Data

Mar. 16, 2015 (JP) .................................. 2015-052261

(51) Int. Cl.
*C22C 38/44* (2006.01)
*C22C 38/38* (2006.01)
(Continued)

(52) U.S. Cl.
CPC ................ *C21D 9/085* (2013.01); *B32B 1/08* (2013.01); *B32B 15/00* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 7/12* (2013.01); *C21D 8/10* (2013.01); *C21D 8/105* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/18* (2013.01); *C22C 38/22* (2013.01); *C22C 38/38* (2013.01); *C22C 38/40* (2013.01); *C22C 38/44* (2013.01); *C22C 38/58* (2013.01); *F16L 9/00* (2013.01); *F16L 9/02* (2013.01);
(Continued)

(58) Field of Classification Search
CPC ...... F16L 9/00; F16L 9/02; F16L 9/18; C21D 7/12; C21D 6/008; C21D 6/005; C21D 6/004; C21D 8/10; C21D 8/105; C21D 9/08; C21D 9/085; C21D 2211/002; C21D 2211/008; C22C 38/06; C22C 38/58; C22C 38/44; C22C 38/38; C22C 38/002; C22C 38/22; C22C 38/001; C22C 38/02; C22C 38/04; C22C 38/12; C22C 38/18; C22C 38/00; C22C 38/08; C22C 38/40; F17C 1/00; F17C 2203/0639; F17C 2203/0604; Y02E 60/321; Y10T 428/12292; Y10T 428/12951; Y10T 428/12972; Y10T 428/13; Y10T 428/12979; Y10T 428/24967; B32B 1/08; B32B 15/01; B32B 15/012; B32B 15/013; B32B 15/04; B32B 15/18; B32B 15/00; B32B 15/043
See application file for complete search history.

(56) References Cited

U.S. PATENT DOCUMENTS 9,089,919 B2    7/2015  Nishimura et al.
2009/0285713 A1  11/2009 Omura et al.
(Continued)

FOREIGN PATENT DOCUMENTS

CN    102666898 A    9/2012
EP    2505682 A1    10/2012
(Continued)

OTHER PUBLICATIONS

Machine Translation, Ueda et al., JP 2011-195883, Oct. 2011. (Year: 2011).*

(Continued)

*Primary Examiner* — Michael E. La Villa
(74) *Attorney, Agent, or Firm* — Kenja IP Law PC

(57) ABSTRACT

Steel material for composite pressure vessel liners that, when used as raw material for manufacturing a composite pressure vessel liner, yields a liner having sufficient strength and a high fatigue limit and enables the manufacture of an inexpensive composite pressure vessel is provided. Steel material for composite pressure vessel liners comprises: a chemical composition containing, in mass %, C: 0.10% to 0.60%, Si: 0.01% to 2.0%, Mn: 0.1% to 5.0%, P: 0.0005% to 0.060%, S: 0.0001% to 0.010%, N: 0.0001% to 0.010%, and Al: 0.01% to 0.06%, with a balance being Fe and incidental impurities; and a metallic microstructure in which a mean grain size of prior austenite grains is 20 μm or less, and a total area ratio of martensite and lower bainite is 90% or more.

11 Claims, No Drawings

(51) Int. Cl.

| | | |
|---|---|---|
| *C22C 38/06* | (2006.01) | |
| *C22C 38/02* | (2006.01) | |
| *C22C 38/00* | (2006.01) | |
| *F17C 1/00* | (2006.01) | |
| *C21D 6/00* | (2006.01) | |
| *C21D 9/08* | (2006.01) | |
| *C21D 8/10* | (2006.01) | |
| *C21D 7/12* | (2006.01) | |
| *C22C 38/12* | (2006.01) | |
| *C22C 38/04* | (2006.01) | |
| *C22C 38/18* | (2006.01) | |
| *C22C 38/22* | (2006.01) | |
| *C22C 38/58* | (2006.01) | |
| *F16L 9/00* | (2006.01) | |
| *F16L 9/18* | (2006.01) | |
| *C22C 38/08* | (2006.01) | |
| *F16L 9/02* | (2006.01) | |
| *C22C 38/40* | (2006.01) | |
| *B32B 15/01* | (2006.01) | |
| *B32B 15/04* | (2006.01) | |
| *B32B 15/00* | (2006.01) | |
| *B32B 15/18* | (2006.01) | |
| *B32B 1/08* | (2006.01) | |

(52) U.S. Cl.
CPC .................. *F16L 9/18* (2013.01); *F17C 1/00* (2013.01); *C21D 9/08* (2013.01); *C21D 2211/002* (2013.01); *C21D 2211/008* (2013.01); *F17C 2203/0604* (2013.01); *F17C 2203/0639* (2013.01); *Y02E 60/321* (2013.01); *Y10T 428/12292* (2015.01); *Y10T 428/12951* (2015.01); *Y10T 428/12972* (2015.01); *Y10T 428/12979* (2015.01); *Y10T 428/13* (2015.01); *Y10T 428/24967* (2015.01)

(56) References Cited

U.S. PATENT DOCUMENTS

| | | | |
|---|---|---|---|
| 2012/0204994 A1* | 8/2012 | Anelli | ............... C21D 1/18 138/177 |
| 2015/0152532 A1 | 6/2015 | Takasawa et al. | |
| 2016/0010193 A1 | 1/2016 | Terazawa et al. | |
| 2016/0053355 A1* | 2/2016 | Takagi | ............... C22C 38/00 148/637 |
| 2016/0060738 A1 | 3/2016 | Nagao et al. | |
| 2016/0091140 A1 | 3/2016 | Takagi et al. | |

FOREIGN PATENT DOCUMENTS

| | | |
|---|---|---|
| JP | 2009074122 A | 4/2009 |
| JP | 2009275249 A | 11/2009 |
| JP | 2009293799 A | 12/2009 |
| JP | 2010037655 A | 2/2010 |
| JP | 2011195883 A | 10/2011 |
| JP | 2012107332 A | 6/2012 |
| JP | 2012107333 A | 6/2012 |
| JP | 2014198878 A | 10/2014 |
| JP | 2014227573 A | 12/2014 |
| WO | 2014132627 A1 | 9/2014 |
| WO | 2014156187 A1 | 10/2014 |
| WO | 2014156188 A1 | 10/2014 |
| WO | 2014174845 A1 | 10/2014 |

OTHER PUBLICATIONS

Dec. 1, 2017, the Extended European Search Report issued by the European Patent Office in the corresponding European Patent Application No. 16764427.7.
Jul. 16, 2018, Office Action issued by the State Intellectual Property Office in the corresponding Chinese Patent Application No. 201680014589.8 with English language Search Report.
Oct. 17, 2018, Office Action issued by the Korean Intellectual Property Office in the corresponding Korean Patent Application No. 10-2017-7025476 with English language concise statement of relevance.
May 14, 2019, Office Action issued by the Korean Intellectual Property Office in the corresponding Korean Patent Application No. 10-2017-7025476 with English language concise statement of relevance.
Jul. 11, 2017, Notification of Reasons for Refusal issued by the Japan Patent Office in the corresponding Japanese Patent Application No. 2016-547962 with English language Concise Statement of Relevance.
Jun. 7, 2016, International Search Report issued in the International Patent Application No. PCT/JP2016/001227.
Yuro Wada et al., "Development and Safety Evaluation of Storage tanks for Hydrogen Filing Station", Japan Steel Works Technical Review, No. 65, The Japan Steel Works, Ltd., Oct. 2014, p. 36 to 45.

* cited by examiner

STEEL MATERIAL FOR COMPOSITE PRESSURE VESSEL LINER AND STEEL PIPE OR TUBE FOR COMPOSITE PRESSURE VESSEL LINER

TECHNICAL FIELD

The disclosure relates to steel material for composite pressure vessel liners that is used for manufacturing a liner of a composite pressure vessel for storing high-pressure hydrogen.

The disclosure also relates to a steel pipe or tube for composite pressure vessel liners that is made of the steel material for composite pressure vessel liners, and a method of manufacturing the steel pipe or tube for composite pressure vessel liners.

BACKGROUND

Fuel-cell vehicles using hydrogen as fuel emit no carbon dioxide ($CO_2$) and have excellent energy efficiency, and so are expected to serve as vehicles that can solve $CO_2$ emission problems and energy problems. To put such fuel-cell vehicles into wide use, hydrogen stations for supplying hydrogen to fuel-cell vehicles need to be installed. This has stimulated the development of vessels (pressure vessels) with excellent strength and durability necessary for safely storing high-pressure hydrogen in hydrogen stations.

Proposed pressure vessels using metal material include: a pressure vessel that is entirely made of metal (Type I); and a composite pressure vessel (Type II, III) formed by coating the outer periphery of a liner made of metal with carbon fiber reinforced plastic (CFRP).

For example, JP 2009-293799 A (PTL 1) proposes a composite pressure vessel whose fatigue crack growth rate in a high-pressure hydrogen environment is improved by coating the outer periphery of a liner made of Cr—Mo steel with CFRP. A pressure vessel made only of metal needs to be thick in order to have sufficient strength to withstand hydrogen pressure. In the composite pressure vessel described in PTL 1, on the other hand, the liner made of steel and the CFRP share the load, so that the liner can be made thinner than that of the pressure vessel made only of metal. This contributes to lighter weight and lower cost.

If the liner's share of load can be increased in the composite pressure vessel, the usage of expensive carbon fiber can be reduced, which further contributes to lower cost. This has raised the need to improve the properties of steel material used for composite pressure vessel liners.

To improve the properties of steel material used for pressure vessels, for example, JP 2010-037655 A (PTL 2), JP 2012-107332 A (PTL 3), JP 2009-275249 A (PTL 4), and JP 2009-074122 A (PTL 5) propose the following techniques. PTL 2 proposes steel material whose hydrogen embrittlement resistance is improved by controlling the chemical composition and microstructure of steel and the precipitates. PTL 3 proposes steel material whose toughness is improved by making the microstructure of steel composed mainly of bainite and controlling the aspect ratio of precipitated cementite. PTL 4 proposes steel material whose hydrogen embrittlement resistance is improved by controlling the chemical composition, thus achieving a high reduction of area in high-pressure hydrogen. PTL 5 proposes steel material whose hydrogen embrittlement resistance is improved by limiting the chemical composition of steel to a predetermined range and controlling carbide formation, thus achieving a high reduction of area in high-pressure hydrogen.

CITATION LIST

Patent Literatures

PTL 1: JP 2009-293799 A
PTL 2: JP 2010-037655 A
PTL 3: JP 2012-107332 A
PTL 4: JP 2009-275249 A
PTL 5: JP 2009-074122 A

SUMMARY

Technical Problem

However, the techniques described in PTL 1 to PTL 5 fail to address fatigue limit improvement, although the hydrogen embrittlement resistance or strength of steel material is improved to a certain extent. A pressure vessel for a hydrogen station is typically used for a long period of 10 years or more. During the period, the pressure vessel repeatedly is filled with and releases hydrogen gas, and the number of repetitions is expected to be 100000 or more. Accordingly, the steel material used for the liner of the pressure vessel is required to have a high fatigue limit (fatigue strength) so as not to fracture even when undergoing fatigue deformation 100000 times in hydrogen gas. Besides, the steel materials proposed in PTL 2 to PTL 5 are all used for pressure vessels made only of steel material, and are not intended for use as material for composite pressure vessel liners.

It could be helpful to provide steel material for composite pressure vessel liners that, when used as raw material for manufacturing a composite pressure vessel liner, yields a liner having sufficient strength and a high fatigue limit and enables the manufacture of an inexpensive composite pressure vessel. It could also be helpful to provide a steel pipe or tube for composite pressure vessel liners that is made of the steel material for composite pressure vessel liners, and a method of manufacturing the steel pipe or tube for composite pressure vessel liners.

Solution to Problem

As a result of studying how the chemical composition and metallic microstructure of steel material used for manufacturing a liner influence the properties of the manufactured liner, we discovered the following:

(1) A composite pressure vessel including a liner made of steel is manufactured by forming a steel pipe or tube in a liner shape and then coating the outer periphery of the liner with CFRP. Here, the formed liner is quenched and tempered to ensure the strength and toughness of the liner.

(2) Hence, steel material that achieves an excellent fatigue limit after quenching and tempering (hereafter also referred to as "heat treatment") needs to be used as raw material, in order to improve the fatigue limit of the finally obtained liner.

(3) In steel material having a specific chemical composition, the mean grain size of prior austenite grains is reduced, and the ratio of martensite and lower bainite to the metallic microstructure is set to a predetermined ratio or more. This improves the fatigue limit after quenching and tempering.

(4) Steel material that satisfies the aforementioned conditions of (3) can be manufactured by controlling the chemical composition and hot working condition of steel raw material.

We conducted detailed study on the chemical composition and microstructure of steel and the manufacturing conditions, based on these discoveries.

We thus provide:

1. Steel material for composite pressure vessel liners, comprising: a chemical composition containing (consisting of), in mass %, C: 0.10% to 0.60%, Si: 0.01% to 2.0%, Mn: 0.1% to 5.0%, P: 0.0005% to 0.060%, S: 0.0001% to 0.010%, N: 0.0001% to 0.010%, and Al: 0.01% to 0.06%, with a balance being Fe and incidental impurities; and a metallic microstructure in which a mean grain size of prior austenite grains is 20 μm or less, and a total area ratio of martensite and lower bainite is 90% or more.

2. The steel material for composite pressure vessel liners according to 1., wherein the chemical composition further contains, in mass %, one or both of Mo: 0.005% to 2.0% and Cr: 0.005% to 3.0%.

3. The steel material for composite pressure vessel liners according to 2., wherein the chemical composition further contains, in mass %, Ni: 0.005% to 3.0%.

4. The steel material for composite pressure vessel liners according to any one of 1. to 3., wherein the chemical composition satisfies a relationship of the following Expression (1):

$$[Mn]+1.30\times[Cr]+2.67\times[Mo]+0.30\times[Ni]\geq 2.30 \quad (1)$$

where [M] denotes a content of element M in mass %, and [M]=0 in the case where the element M is not contained.

5. The steel material for composite pressure vessel liners according to any one of 1. to 3., wherein the chemical composition satisfies a relationship of the following Expression (2):

$$[Mn]+1.30\times[Cr]+2.67\times[Mo]+0.30\times[Ni]\geq 3.00 \quad (2)$$

where [M] denotes a content of element M in mass %, and [M]=0 in the case where the element M is not contained.

6. A steel pipe or tube for composite pressure vessel liners made of the steel material for composite pressure vessel liners according to any one of 1. to 5.

7. The steel pipe or tube for composite pressure vessel liners according to 6., having a wall thickness of 20 mm or more.

8. A method of manufacturing a steel pipe or tube for composite pressure vessel liners, comprising: heating steel raw material having the chemical composition according to any one of 1. to 3., to a temperature of 1350° C. or less; rolling and pipe-or-tube-expanding the heated steel raw material with a pipe or tube expansion finish temperature being 820° C. or more, to yield a steel pipe or tube; and cooling the steel pipe or tube yielded by the rolling and pipe-or-tube-expanding, with an average cooling rate from 800° C. to 350° C. being 5° C./s or more.

9. A method of manufacturing a steel pipe or tube for composite pressure vessel liners, comprising: heating steel raw material having the chemical composition according to 4., to a temperature of 1350° C. or less; rolling and pipe-or-tube-expanding the heated steel raw material with a pipe or tube expansion finish temperature being 820° C. or more, to yield a steel pipe or tube; and cooling the steel pipe or tube yielded by the rolling and pipe-or-tube-expanding, with an average cooling rate from 800° C. to 350° C. being 3° C./s or more.

10. A method of manufacturing a steel pipe or tube for composite pressure vessel liners, comprising: heating steel raw material having the chemical composition according to 5., to a temperature of 1350° C. or less; rolling and pipe-or-tube-expanding the heated steel raw material with a pipe or tube expansion finish temperature being 820° C. or more, to yield a steel pipe or tube; and cooling the steel pipe or tube yielded by the rolling and pipe-or-tube-expanding, with an average cooling rate from 800° C. to 350° C. being 1° C./s or more.

Advantageous Effect

It is thus possible to provide steel material for composite pressure vessel liners that, when used as raw material for manufacturing a composite pressure vessel liner, yields a liner having sufficient strength and a high fatigue limit. A liner manufactured using the steel material for composite pressure vessel liners can bear a larger share of load, with it being possible to reduce the usage of CFRP. Hence, a composite pressure vessel can be provided at lower cost.

DETAILED DESCRIPTION

Detailed description is given below.

In the disclosure, it is important that steel material has a metallic microstructure in which the mean grain size of prior austenite grains is 20 μm or less and the total area ratio of martensite and lower bainite is 90% or more. The reasons for limiting the metallic microstructure of the steel material in this way are explained below. Here, "%" regarding a metallic microstructure denotes an area ratio unless otherwise stated.

[Metallic Microstructure]

Mean Grain Size of Prior Austenite Grains: 20 μm or Less

When the prior austenite grain size of the steel material for composite pressure vessel liners is smaller, the prior austenite grain size after forming the steel material to yield a liner and quenching and tempering (heat treating) the liner is smaller. A liner with a smaller prior austenite grain size has a higher fatigue limit in high-pressure hydrogen. To achieve this effect, the mean grain size of prior austenite grains in the steel material for liners, that is, the steel material as raw material for manufacturing liners, is 20 μm or less. The mean grain size of prior austenite grains is preferably 10 μm or less, and more preferably 5 μm or less. No lower limit is placed on the mean grain size of prior austenite grains, yet the mean grain size of prior austenite grains is preferably 1 μm or more.

Total Area Ratio of Martensite and Lower Bainite: 90% or More

If the total of martensite and lower bainite in the metallic microstructure of the steel material for liners is less than 90%, coarse prior austenite grains form during heat treatment after liner formation. Accordingly, the total area ratio of martensite and lower bainite in the metallic microstructure of the steel material for liners is 90% or more. The total area ratio of martensite and lower bainite is preferably 95% or more. No limit is placed on the proportion between martensite and lower bainite in their area ratio, yet the area ratio of martensite is preferably higher than the area ratio of lower bainite in terms of preventing the coarsening of prior austenite grains. No upper limit is placed on the total area ratio of martensite and lower bainite, and the total area ratio of martensite and lower bainite may be 100% or less.

Microstructures other than martensite and lower bainite in the steel material for liners are preferably as little as possible. As long as the total area ratio of martensite and lower bainite is 90% or more, however, the influence of the balance is not significant, and so containing one or more other phases such as ferrite, retained austenite, pearlite, and upper bainite at a total area ratio of 10% or less is allowable. The total area ratio of phases other than martensite and lower bainite is preferably 5% or less.

[Chemical Composition]

In the disclosure, it is also important that the steel material for composite pressure vessel liners has a predetermined chemical composition. The reasons for limiting the chemical composition of the steel material are explained below. Here, "%" regarding components denotes mass % unless otherwise stated.

C: 0.10% to 0.60%

C is an element necessary to increase liner strength. A liner after quenching and tempering preferably has a tensile strength of 800 MPa or more. To obtain such strength, the C content of the steel material for liners is 0.10% or more. If the C content is more than 0.60%, quench cracks may occur during quenching. The C content is therefore 0.60% or less. The C content is preferably 0.33% or more and 0.45% or less.

Si: 0.01% to 2.0%

Si is an element that contributes to improved strength and improved fatigue limit by solid solution strengthening. These effects are achieved if the Si content is 0.01% or more. If the Si content is more than 2.0%, the effects saturate. Besides, the surface characteristics of the steel material degrade, and rollability decreases. The Si content is therefore 0.01% or more and 2.0% or less. The Si content is preferably 0.15% or more and 0.5% or less.

Mn: 0.1% to 5.0%

Mn is an element that contributes to improved strength by solid solution strengthening and quench hardenability improvement and has a function of improving the fatigue limit. Mn also prevents the coarsening of prior austenite grains. To achieve these effects, the Mn content is 0.1% or more. The Mn content is preferably 0.5% or more, and more preferably 0.6% or more. If the Mn content is more than 5.0%, the effects saturate, and rolling and formation are difficult. Besides, austenite remains after heat treatment following liner formation, causing degradation in fatigue properties. The Mn content is therefore 5.0% or less. The Mn content is preferably 1.5% or less.

P: 0.0005% to 0.060%

P is an element that contributes to improved strength by solid solution strengthening, but also degrades toughness. If the P content is more than 0.060%, toughness degrades significantly. The P content is therefore 0.060% or less. The P content is preferably 0.025% or less, and more preferably 0.015% or less. Excessively reducing P so that the P content is less than 0.0005% increases the manufacturing cost in the steelmaking process. The P content is therefore 0.0005% or more.

S: 0.0001% to 0.010%

Increasing the S content causes hot red shortness, which may lead to manufacturing defects. S also forms MnS as an inclusion, and decreases toughness. These problems do not occur as long as the S content is 0.010% or less. The S content is therefore 0.010% or less. The S content is preferably 0.0030% or less. Excessively reducing S so that the S content is less than 0.0001% increases the desulfurization cost in the steelmaking process. The S content is therefore 0.0001% or more.

The total content of P and S is more preferably 0.02% or less, for high-level toughness stabilization. The total content of P and S is desirably low, but excessively reducing P and S increases the manufacturing cost and so the total content of P and S is 0.0006% or more.

N: 0.0001% to 0.010%

N has little influence on the fatigue properties of the steel material, and the advantageous effects of the disclosure are not lessened if the N content is 0.010% or less. The N content is therefore 0.010% or less. The N content is preferably 0.004% or less. The N content is desirably low in terms of improving toughness. However, excessively reducing N increases the cost in steelmaking, and so the N content is 0.0001% or more.

Al: 0.01% to 0.06%

Al is an element effective as a deoxidizer in the steelmaking process. To achieve this effect, the Al content is 0.01% or more. The Al content is preferably 0.02% or more. If the Al content is more than 0.06%, the effect saturates. The Al content is therefore 0.06% or less.

In addition to the components described above, the steel material for composite pressure vessel liners has the balance being Fe and incidental impurities. The steel material for composite pressure vessel liners may optionally contain one or both of Mo: 0.005% to 2.0% and Cr: 0.005% to 3.0%, in addition to the aforementioned elements.

Mo: 0.005% to 2.0%

Mo is an element that improves quench hardenability, and has a function of contributing to higher liner strength and increasing the ratio of martensite and lower bainite in the metallic microstructure of the steel material. Mo also prevents the coarsening of prior austenite grains, and contributes to higher fatigue strength by solid solution strengthening. To achieve these effects, in the case of adding Mo, the Mo content is 0.005% or more. The Mo content is preferably 0.1% or more. If the Mo content is more than 2.0%, the effects saturate, and higher cost is required. The Mo content is therefore 2.0% or less. The Mo content is preferably 1.0% or less, and more preferably 0.5% or less.

Cr: 0.005% to 3.0%

Cr is an element that improves quench hardenability, and has a function of contributing to higher liner strength and increasing the ratio of martensite and lower bainite in the metallic microstructure of the steel material. Cr also prevents the coarsening of prior austenite grains. To achieve these effects, in the case of adding Cr, the Cr content is 0.005% or more. The Cr content is preferably 0.5% or more. If the Cr content is more than 3.0%, the effects saturate, and higher cost is required. The Cr content is therefore 3.0% or less. The Cr content is more preferably 1.5% or less.

The steel material for composite pressure vessel liners may optionally contain Ni: 0.005% to 3.0%, in addition to the aforementioned elements.

Ni: 0.005% to 3.0%

Ni is an element that improves quench hardenability, and has a function of contributing to higher liner strength and increasing the ratio of martensite and lower bainite in the metallic microstructure of the steel material. Ni also prevents the coarsening of prior austenite grains. To achieve these effects, in the case of adding Ni, the Ni content is 0.005% or more. The Ni content is preferably 0.5% or more. If the Ni content is more than 3.0%, the effects saturate, and higher cost is required. The Ni content is therefore 3.0% or less. The Ni content is preferably 2.0% or less, for cost reduction.

In one of the disclosed embodiments, the chemical composition of the steel material preferably satisfies the relationship of the following Expression (1):

$$[Mn]+1.30\times[Cr]+2.67\times[Mo]+0.30\times[Ni]\geq 2.30 \qquad (1)$$

(where [M] denotes the content (mass %) of element M, and [M]=0 in the case where the element M is not contained).

When the chemical composition of the steel material satisfies the relationship of Expression (1), the quench hardenability of the steel is improved, so that martensite and lower bainite can be obtained more easily.

Moreover, when the chemical composition satisfies the relationship of the following Expression (2), the quench hardenability of the steel is further improved, so that martensite and lower bainite can be obtained very easily.

Further, the appropriate microstructure is easily obtained in liner manufacturing.

$$[Mn]+1.30\times[Cr]+2.67\times[Mo]+0.30\times[Ni]\geq 3.00 \qquad (2)$$

(where [M] denotes the content (mass %) of element M, and [M]=0 in the case where the element M is not contained).

Specific manufacturing conditions for obtaining martensite and lower bainite will be described later.

[Shape]

The shape of the steel material for composite pressure vessel liners is not limited, and may be any shape such as a steel pipe or tube or a steel sheet. In terms of being used as raw material for forming a composite pressure vessel liner, the steel material is preferably shaped as a steel pipe or tube, and more preferably shaped as a seamless steel pipe or tube. The steel material may be shaped as a steel sheet used when manufacturing a welded steel pipe or tube such as a forge-welded steel pipe or tube or an electric-resistance-welded steel pipe or tube.

Wall Thickness: 20 mm or More

In the case of shaping the steel material for composite pressure vessel liners as a steel pipe or tube, its wall thickness is preferably 20 mm or more. If the wall thickness of the steel pipe or tube is 20 mm or more, the liner's share of stress can be increased in the finally obtained composite pressure vessel. This reduces the usage of CFRP, and contributes to lower cost of composite pressure vessels. The fatigue limit in high-pressure hydrogen is further improved by forming a steel pipe or tube with a wall thickness of 20 mm or more to yield a liner and then subjecting the liner to autofrettage treatment to apply residual compressive stress to the inside of the liner. The wall thickness of the steel pipe or tube is more preferably 30 mm or more, and further preferably 36 mm or more. In the case of shaping the steel material for composite pressure vessel liners as a steel sheet, too, its sheet thickness is preferably 20 mm or more, more preferably 30 mm or more, and further preferably 36 mm or more. If the wall thickness is excessive, the stress of the outside of the liner becomes excessively high during pressure storage. Besides, the additive amount of alloy needs to be increased to obtain the desired microstructure, which requires higher cost. Accordingly, the wall thickness is preferably 80 mm or less, and further preferably 60 mm or less.

[Manufacturing Method]

A method of manufacturing the steel material for composite pressure vessel liners is described below. Although the following describes the manufacturing method using an example where the steel material is a seamless steel pipe or tube, steel material of any other shape can be manufactured by performing the process so as to realize the same heat hysteresis. For example, in the case of a steel sheet, the same properties can be obtained by rolling the steel material with the finisher delivery temperature being 820° C. or more and then cooling the steel material with the average cooling rate from 800° C. to 350° C. being 5° C./s or more.

The steel pipe or tube for composite pressure vessel liners can be manufactured by performing the following steps (1) to (3) in order:

(1) a heating step of heating steel raw material;

(2) a rolling and pipe or tube expansion step of rolling and pipe-or-tube-expanding the heated steel raw material to yield a steel pipe or tube; and (3) a cooling step of cooling the steel pipe or tube yielded in the rolling and pipe or tube expansion step.

Each of the steps is described below. The temperatures in the following description of the heating step, the rolling and pipe or tube expansion step, and the cooling step each denote the temperature of the surface of the steel raw material or steel pipe or tube unless otherwise stated.

[Heating Step]

Steel raw material having the chemical composition described above is heated in order to perform hot rolling. The steel raw material is not limited. For example, the steel raw material may be a billet obtained by typical continuous casting.

If the heating temperature in the heating step is more than 1350° C., the mean grain size of prior austenite grains cannot be 20 μm or less. The heating temperature is therefore 1350° C. or less. The heating temperature is preferably as low as possible. However, if the heating temperature is excessively low, the temperature of the raw material decreases before the final step, which makes it difficult to obtain 90% or more martensite and lower bainite in total. The heating temperature is therefore preferably 950° C. or more.

[Rolling and Pipe or Tube Expansion Step]

Next, the steel raw material heated in the heating step is rolled and pipe-or-tube-expanded into the shape of a steel pipe or tube. The rolling may be hot rolling including piercing rolling by typical Mannesmann plug mill process or Mannesmann mandrel mill process. Here, if the pipe or tube expansion finish temperature is less than 820° C., it is difficult to achieve a total area ratio of martensite and lower bainite of 90% or more. The pipe or tube expansion finish temperature is therefore 820° C. or more. No upper limit is placed on the pipe or tube expansion finish temperature. However, if the temperature is excessively high, the metallic microstructure tends to be not uniform. The pipe or tube expansion finish temperature is therefore preferably 1200° C. or less.

[Cooling Step]

The steel pipe or tube obtained in the rolling and pipe or tube expansion step is then cooled to room temperature. Here, the cooling rate needs to be controlled to obtain the desired metallic microstructure. If the average cooling rate in the temperature range of 800° C. to 350° C. in the longitudinal center part of the steel pipe or tube is less than 5° C./s, phases other than martensite and lower bainite, such as ferrite, upper bainite, and pearlite, form. This causes degradation in the fatigue properties of the liner as a final product. Accordingly, in one of the disclosed embodiments, the average cooling rate from 800° C. to 350° C. is 5° C./s or more. In the case where the chemical composition of the steel satisfies the relationship of Expression (1) as mentioned above, however, the desired microstructure can be obtained if the average cooling rate from 800° C. to 350° C. is 3° C./s or more. Moreover, in the case where the chemical composition of the steel satisfies the relationship of Expression (2), the desired microstructure can be obtained if the average cooling rate from 800° C. to 350° C. is 1° C./s or more. The cooling method is not limited, and any of the methods such as water cooling, oil quenching, and air cooling may be used singly or in combination. In terms of both fast cooling and quench crack prevention, oil quenching is preferable.

EXAMPLES

More detailed description is given below, based on examples. The following examples merely represent preferred examples, and the disclosure is not limited to these examples.

Billets of 330 mm in diameter having the chemical compositions listed in Table 1 were produced, and rolled and pipe-or-tube-expanded to an outer diameter of 370 mm to yield steel pipes or tubes. Table 2 lists the manufacturing conditions. The metallic microstructure of each of the steel pipes or tubes was evaluated. The evaluation methods are as follows.

Mean Grain Size of Prior Austenite Grains

A section of a test piece collected from a wall thickness/4 position of the longitudinal center part of the steel pipe or tube was etched using a saturated picric acid solution, to reveal prior austenite crystal grain boundaries. The prior austenite ($\gamma$) grain size was determined by a cutting method from an observation photograph of the prior austenite crystal grain boundaries taken using an optical microscope.

Metallic Microstructure

The metallic microstructure in the steel pipe or tube was evaluated as follows. A section of a test piece collected from a wall thickness/4 position of the longitudinal center part of the steel pipe or tube was etched using a 3 vol % nital solution. The section was then observed using a scanning electron microscope (SEM) at appropriate magnifications from 1000 to 5000, and the obtained image was analyzed to evaluate the type of the microstructure and the area ratio. Retained austenite was measured by X-ray diffraction measurement.

To evaluate the properties of a liner manufactured using the steel pipe or tube obtained as mentioned above, the liner was actually manufactured and its metallic microstructure and mechanical properties after quenching and tempering were evaluated. The liner was manufactured by performing the following steps (a) to (c) in order:

(a) a formation step of forming and working the steel pipe or tube in a liner shape;

(b) an oil quenching step of heating the obtained liner to 850° C., holding the liner at the temperature for 120 minutes, and then immersing the liner in quenching oil; and (c) a tempering step of tempering the quenched liner at 650° C. for 180 minutes.

The temperature in each of steps (b) and (c) is the temperature in the wall thickness center part in the longitudinal center part of the liner, and was measured by embedding a thermocouple in the liner.

Upon evaluating the obtained liner, the mean grain size of prior austenite grains and the microstructure were measured by the same methods as the aforementioned steel pipe or tube evaluation, for a portion of 5 mm or less from the inner surface in the wall thickness direction of a test piece collected from the inner surface of the longitudinal center part of the liner. The other items were evaluated by the following methods. All evaluations and measurements for the liner were conducted by collecting a test piece from the inner surface part of the longitudinal center part of the liner, unless otherwise stated. Table 2 lists the measurement results.

Mean Block Length

The mean block length in the martensite and lower bainite microstructure was determined based on electron backscattering pattern (EBSP) measurement. EBSP measurement was performed in a region of three or more prior austenite grains, blocks were identified, and their mean length in the longitudinal direction was calculated. The length measured here is the maximum length of each block in the direction parallel to (110) plane, and the mean is the arithmetic mean. The "block" mentioned here is defined as a region that is surrounded by large-angle grain boundaries and includes no boundary of an orientation difference of 8° or more inside.

Tensile Strength (TS)

A round bar test piece of 7 mm in diameter was collected from the obtained liner according to JIS Z 2201, and its tensile strength was measured.

Fatigue Limit

The fatigue limit was measured by a fatigue test in high-pressure hydrogen. A fatigue test was conducted in high-pressure hydrogen of 90 MPa with a stress ratio of −1, using a test piece of 7 mm in evaluation portion diameter collected from the liner. The critical stress not resulting in a fracture of the test piece in 200000 cycles was set as the fatigue limit.

Charpy Absorbed Energy

A Charpy impact test was performed according to JIS Z 2242, to measure Charpy absorbed energy at −30° C. A test piece was collected in the raw material rolling direction, and V-notched. The test was performed on three test pieces, and their mean value was set as the Charpy absorbed energy.

As can be seen from Table 2, all liners (Examples) manufactured using steel pipes or tubes each having a chemical composition and a metallic microstructure satisfying the conditions according to the disclosure had excellent properties with a sufficient tensile strength of 800 MPa or more and an excellent fatigue limit of 350 MPa or more, as well as a (fatigue limit/tensile strength) value, which is a relative fatigue strength index, of 0.47 or more and a Charpy absorbed energy at −30° C. of 54 J or more. Meanwhile, the liners manufactured using steel pipes or tubes Nos. 2, 4, 6, 14, 16, 17, and 18 each having a steel chemical composition and/or a metallic microstructure not satisfying the conditions according to the disclosure had poor fatigue strength with a (fatigue limit/tensile strength) value of less than 0.47, and had poor performance as a composite pressure vessel liner with a Charpy absorbed energy of less than 54 J.

Thus, a composite pressure vessel liner manufactured using the steel material for liners and steel pipe or tube for liners according to the disclosure has sufficient strength and a high fatigue limit. In a composite pressure vessel including such a liner, the liner can bear a larger share of load, with it being possible to reduce the usage of CFRP. Hence, the composite pressure vessel can be provided at lower cost.

TABLE 1

| Steel sample ID | Chemical composition (mass %) | | | | | | | | | | P + S | [Mn] + 1.30[Cr] + 2.67[Mo] + 0.30[Ni] | Remarks |
|---|---|---|---|---|---|---|---|---|---|---|---|---|---|
| | C | Si | Mn | P | S | Al | N | Mo | Cr | Ni | | | |
| A | 0.32 | 0.21 | 1.23 | 0.024 | 0.0026 | 0.03 | 0.0032 | 0.18 | 1.32 | — | 0.027 | 3.43 | Conforming steel |
| B | 0.35 | 0.18 | 0.84 | 0.013 | 0.0020 | 0.04 | 0.0026 | 0.17 | 1.01 | — | 0.015 | 2.61 | Conforming steel |
| C | 0.37 | 0.24 | 0.68 | 0.014 | 0.0022 | 0.02 | 0.0027 | 0.25 | 1.16 | — | 0.016 | 2.86 | Conforming steel |
| D | 0.43 | 0.28 | 0.87 | 0.007 | 0.0019 | 0.03 | 0.0034 | 0.20 | 0.95 | — | 0.009 | 2.64 | Conforming steel |
| E | 0.52 | 0.32 | 0.71 | 0.020 | 0.0040 | 0.02 | 0.0032 | 0.153 | 0.92 | — | 0.024 | 2.31 | Conforming steel |
| F | 0.34 | 0.95 | 1.66 | 0.012 | 0.0037 | 0.03 | 0.0037 | 0.05 | 2.01 | — | 0.016 | 4.41 | Conforming steel |
| G | 0.46 | 0.25 | 0.65 | 0.021 | 0.0007 | 0.02 | 0.0020 | 1.50 | 0.08 | — | 0.022 | 4.76 | Conforming steel |
| H | 0.36 | 0.33 | 1.07 | 0.016 | 0.0016 | 0.03 | 0.0035 | 1.12 | — | — | 0.018 | 4.06 | Conforming steel |
| I | 0.41 | 0.24 | 2.15 | 0.016 | 0.0009 | 0.04 | 0.0012 | — | 1.64 | — | 0.017 | 4.28 | Conforming steel |
| J | 0.33 | 0.18 | 0.59 | 0.021 | 0.0022 | 0.03 | 0.0019 | 0.17 | 0.90 | — | 0.023 | 2.21 | Conforming steel |
| K | 0.51 | 0.19 | 2.14 | 0.010 | 0.0009 | 0.04 | 0.0023 | — | — | — | 0.011 | 2.14 | Conforming steel |
| L | 0.05 | 0.22 | 0.85 | 0.022 | 0.0014 | 0.03 | 0.0027 | 0.16 | 0.92 | — | 0.023 | 2.47 | Comparative steel |
| M | 0.31 | 2.40 | 0.44 | 0.022 | 0.0042 | 0.04 | 0.0030 | 0.08 | 0.25 | — | 0.026 | 0.98 | Comparative steel |
| N | 0.39 | 0.20 | 5.22 | 0.019 | 0.0030 | 0.03 | 0.0025 | 0.10 | 1.07 | — | 0.022 | 6.88 | Comparative steel |
| O | 0.30 | 0.21 | 0.43 | 0.018 | 0.0029 | 0.03 | 0.0014 | 0.08 | 0.62 | 0.52 | 0.021 | 1.61 | Conforming steel |
| P | 0.35 | 0.23 | 0.62 | 0.021 | 0.0020 | 0.02 | 0.0018 | 0.16 | 0.65 | 1.6 | 0.023 | 2.37 | Conforming steel |
| Q | 0.38 | 0.18 | 0.78 | 0.015 | 0.0017 | 0.03 | 0.0022 | 0.23 | 0.84 | 1.85 | 0.017 | 3.04 | Conforming steel |
| R | 0.42 | 0.20 | 0.89 | 0.013 | 0.0009 | 0.03 | 0.0015 | 0.30 | 1.11 | 0.94 | 0.014 | 3.42 | Conforming steel |

TABLE 2

| No. | Steel sample ID | Steel pipe or tube manufacturing condition | | | Steel pipe or tube | | | | Liner after quenching and tempering | | | | | | | | Remarks |
|---|---|---|---|---|---|---|---|---|---|---|---|---|---|---|---|---|---|
| | | Heating temperature (°C.) | Pipe or tube expansion finish temperature (°C.) | Cooling rate*1 (°C./s) | Prior γ grain size (μm) | M + LB area ratio*2 (%) | Balance*2 | Wall thickness (mm) | Prior γ grain size (μm) | Mean block length*3 (μm) | M + LB area ratio*2 (%) | Balance*2 | TS (MPa) | Fatigue limit (MPa) | Fatigue limit/TS | Charpy absorbed energy (J) | |
| 1 | A | 1200 | 1000 | 15 | 15 | 100 | — | 20 | 7 | 3 | 100 | — | 858 | 413 | 0.48 | 72 | Example |
| 2 | A | 1370 | 1000 | 15 | 30 | 100 | — | 20 | 20 | 10 | 100 | — | 850 | 353 | 0.42 | 44 | Comparative Example |
| 3 | B | 1150 | 920 | 10 | 7 | 100 | — | 38 | 6 | 2 | 100 | — | 870 | 435 | 0.50 | 85 | Example |
| 4 | B | 1150 | 750 | 10 | 7 | 72 | F, RA | 38 | 22 | 11 | 100 | — | 844 | 349 | 0.41 | 42 | Comparative Example |
| 5 | C | 1250 | 860 | 10 | 12 | 100 | — | 46 | 5 | 2 | 100 | — | 891 | 468 | 0.53 | 91 | Example |
| 6 | C | 1250 | 860 | 1 | 12 | 80 | P, UB | 46 | 18 | 6 | 100 | — | 877 | 371 | 0.42 | 46 | Comparative Example |
| 7 | D | 1200 | 880 | 10 | 10 | 99 | UB | 50 | 5 | 2 | 100 | — | 907 | 465 | 0.51 | 94 | Example |
| 8 | E | 1230 | 1000 | 5 | 20 | 100 | — | 60 | 7 | 4 | 100 | — | 952 | 443 | 0.47 | 78 | Example |
| 9 | F | 1180 | 900 | 3 | 8 | 98 | UB | 55 | 5 | 2 | 98 | UB | 899 | 452 | 0.50 | 82 | Example |
| 10 | G | 1000 | 850 | 7 | 5 | 97 | UB | 42 | 5 | 3 | 100 | — | 937 | 456 | 0.49 | 91 | Example |
| 11 | H | 1130 | 880 | 20 | 7 | 100 | — | 25 | 5 | 2 | 100 | — | 893 | 446 | 0.50 | 93 | Example |
| 12 | I | 1200 | 980 | 35 | 10 | 100 | — | 40 | 6 | 2 | 100 | — | 901 | 470 | 0.52 | 93 | Example |
| 13 | J | 1250 | 950 | 5 | 8 | 96 | UB | 38 | 6 | 4 | 97 | UB | 871 | 412 | 0.47 | 65 | Example |
| 14 | J | 1250 | 950 | 3 | 8 | 75 | UB, P | 38 | 10 | 8 | 97 | UB | 858 | 380 | 0.44 | 53 | Comparative Example |
| 15 | K | 1200 | 950 | 15 | 15 | 90 | UB | 38 | 14 | 7 | 96 | UB | 971 | 452 | 0.47 | 59 | Example |
| 16 | L | 1180 | 1000 | 10 | 13 | 65 | P, F | 38 | 20 | 11 | 80 | P, F | 709 | 318 | 0.45 | 22 | Comparative Example |
| 17 | M | 1180 | 920 | 10 | 12 | 80 | P, F | 40 | 18 | 8 | 92 | F | 746 | 331 | 0.44 | 27 | Comparative Example |
| 18 | N | 1150 | 950 | 20 | 10 | 83 | RA | 25 | 7 | 4 | 90 | RA | 889 | 382 | 0.43 | 31 | Comparative Example |
| 19 | O | 1250 | 1000 | 5 | 12 | 90 | UB | 60 | 12 | 6 | 96 | UB | 852 | 383 | 0.47 | 59 | Example |
| 20 | P | 1200 | 950 | 3 | 8 | 94 | UB | 60 | 8 | 3 | 97 | UB | 883 | 406 | 0.48 | 65 | Example |

TABLE 2-continued

| No. | Steel sample ID | Heating temperature (° C.) | Pipe or tube expansion finish temperature (° C.) | Cooling rate*1 (° C./s) | Prior γ grain size (μm) | M + LB area ratio*2 (%) | Balance*2 | Wall thickness (mm) | Prior γ grain size (μm) | Mean block length*3 (μm) | M + LB area ratio*2 (%) | Balance*2 | TS (MPa) | Fatigue limit (MPa) | Fatigue limit/TS | Charpy absorbed energy (J) | Remarks |
|---|---|---|---|---|---|---|---|---|---|---|---|---|---|---|---|---|---|
| 21 | Q | 1250 | 980 | 2 | 7 | 100 | — | 60 | 6 | 2 | 99 | UB | 951 | 456 | 0.48 | 84 | Example |
| 22 | R | 1180 | 920 | 1 | 5 | 100 | — | 60 | 5 | 2 | 100 | — | 1014 | 497 | 0.49 | 95 | Example |

*1Average cooling rate from 800° C. to 350° C.
*2M: martensite, LB: lower bainite, F: ferrite, RA: retained austenite, UB: upper bainite, P: pearlite
*3Mean block length in martensite and lower bainite microstructure

The invention claimed is:

1. Steel material for composite pressure vessel liners, comprising:
a chemical composition consisting of, in mass %,
C: 0.10% to 0.60%,
Si: 0.01% to 2.0%,
Mn: 0.1% to 5.0%,
P: 0.0005% to 0.060%,
S: 0.0001% to 0.010%,
N: 0.0001% to 0.010%,
Al: 0.01% to 0.06%, and optionally at least one element selected from the group consisting of Mo: 0.005% to 2.0%, Cr: 0.005% to 3.0% and Ni: 0.005% to 3.0%, with a balance being Fe and incidental impurities; and
a metallic microstructure in which a mean grain size of prior austenite grains is 20 μm or less, and a total area ratio of martensite and lower bainite is 90% or more.

2. The steel material for composite pressure vessel liners according to claim 1,
wherein the chemical composition satisfies a relationship of the following Expression (1):

$$[Mn]+1.30\times[Cr]+2.67\times[Mo]+0.30\times[Ni]\geq 2.30 \quad (1)$$

where [M] denotes a content of element M in mass %, and [M]=0 in the case where the element M is not contained.

3. The steel material for composite pressure vessel liners according to claim 1,
wherein the chemical composition satisfies a relationship of the following Expression (2):

$$[Mn]+1.30\times[Cr]+2.67\times[Mo]+0.30\times[Ni]\geq 3.00 \quad (2)$$

where [M] denotes a content of element M in mass %, and [M]=0 in the case where the element M is not contained.

4. A steel pipe or tube for composite pressure vessel liners made of the steel material for composite pressure vessel liners according to claim 1.

5. The steel pipe or tube for composite pressure vessel liners according to claim 4, having a wall thickness of 20 mm or more.

6. The steel material for composite pressure vessel liners according to claim 1,
wherein the chemical composition contains, in mass %, one or both of Mo: 0.005% to 2.0% and Cr: 0.005% to 3.0%.

7. The steel material for composite pressure vessel liners according to claim 6,
wherein the chemical composition satisfies a relationship of the following Expression (1):

$$[Mn]+1.30\times[Cr]+2.67\times[Mo]+0.30\times[Ni]\geq 2.30 \quad (1)$$

where [M] denotes a content of element M in mass %, and [M]=0 in the case where the element M is not contained.

8. The steel material for composite pressure vessel liners according to claim 6,
wherein the chemical composition satisfies a relationship of the following Expression (2):

$$[Mn]+1.30\times[Cr]+2.67\times[Mo]+0.30\times[Ni]\geq 3.00 \quad (2)$$

where [M] denotes a content of element M in mass %, and [M]=0 in the case where the element M is not contained.

9. The steel material for composite pressure vessel liners according to claim 6,
wherein the chemical composition contains, in mass %, Ni: 0.005% to 3.0%.

10. The steel material for composite pressure vessel liners according to claim 9,
wherein the chemical composition satisfies a relationship of the following Expression (1):

$$[Mn]+1.30\times[Cr]+2.67\times[Mo]+0.30\times[Ni]\geq 2.30 \quad (1)$$

where [M] denotes a content of element M in mass %, and [M]=0 in the case where the element M is not contained.

11. The steel material for composite pressure vessel liners according to claim 9,
wherein the chemical composition satisfies a relationship of the following Expression (2):

$$[Mn]+1.30\times[Cr]+2.67\times[Mo]+0.30\times[Ni]\geq 3.00 \quad (2)$$

where [M] denotes a content of element M in mass %, and [M]=0 in the case where the element M is not contained.

* * * * *